June 8, 1954  F. C. WILSON  2,680,287
FOUR-WHEELED DOLLY FOR SUPPORTING MOTOR
VEHICLE PARTS DURING REPAIR WORK
Filed Dec. 18, 1950  3 Sheets-Sheet 1
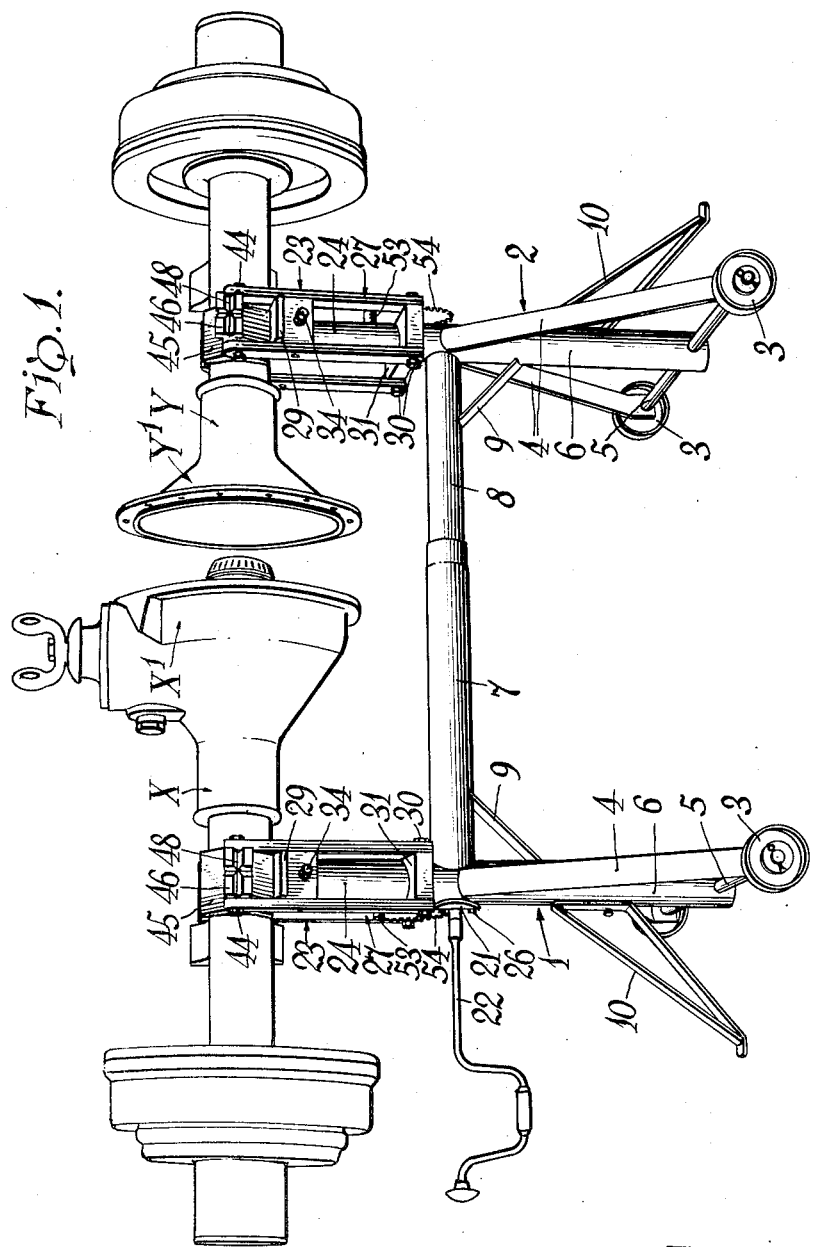
Inventor
Frank C. Wilson,
By
John S. Powers.
Attorney

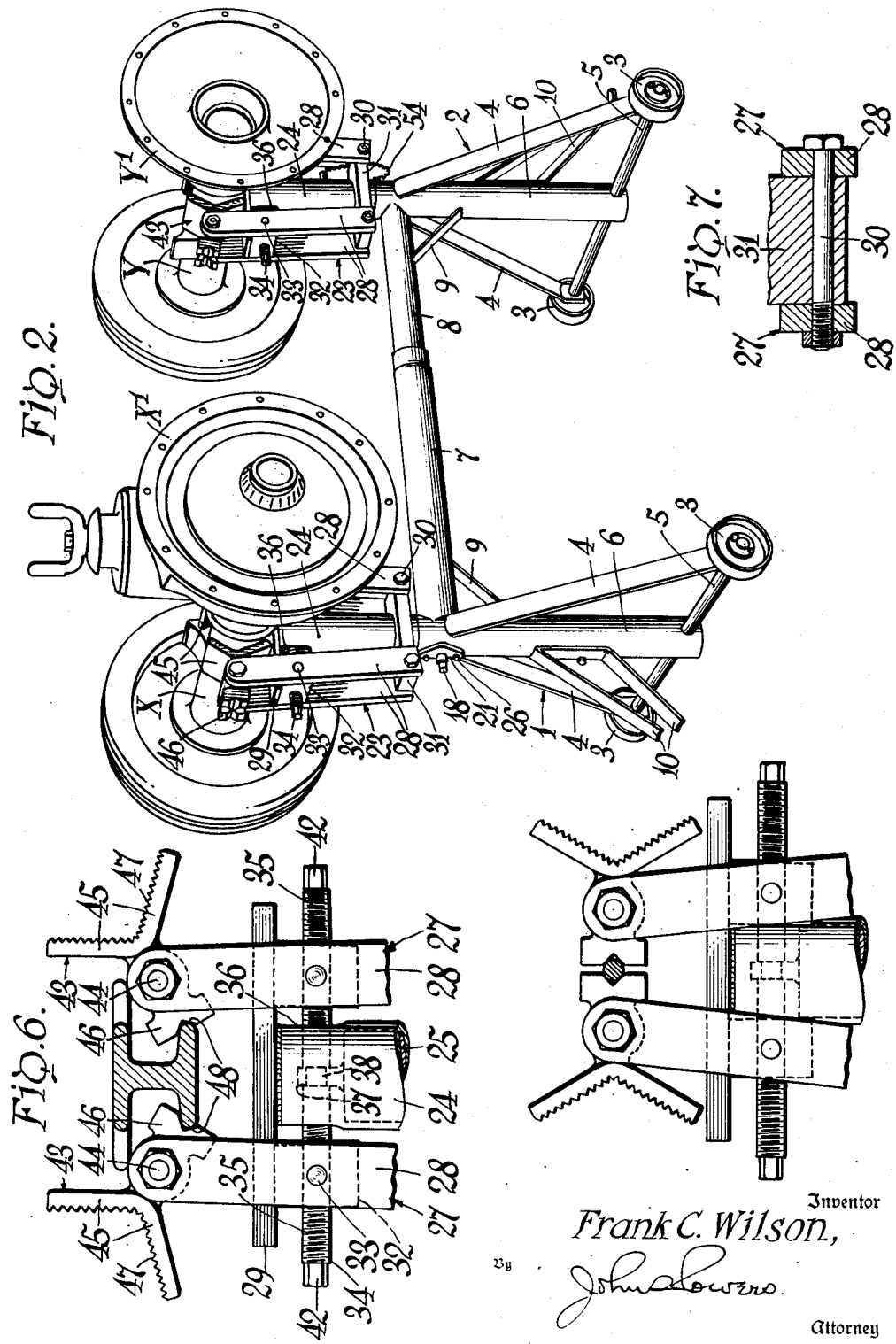

June 8, 1954
F. C. WILSON
2,680,287
FOUR-WHEELED DOLLY FOR SUPPORTING MOTOR
VEHICLE PARTS DURING REPAIR WORK
Filed Dec. 18, 1950
3 Sheets-Sheet 3
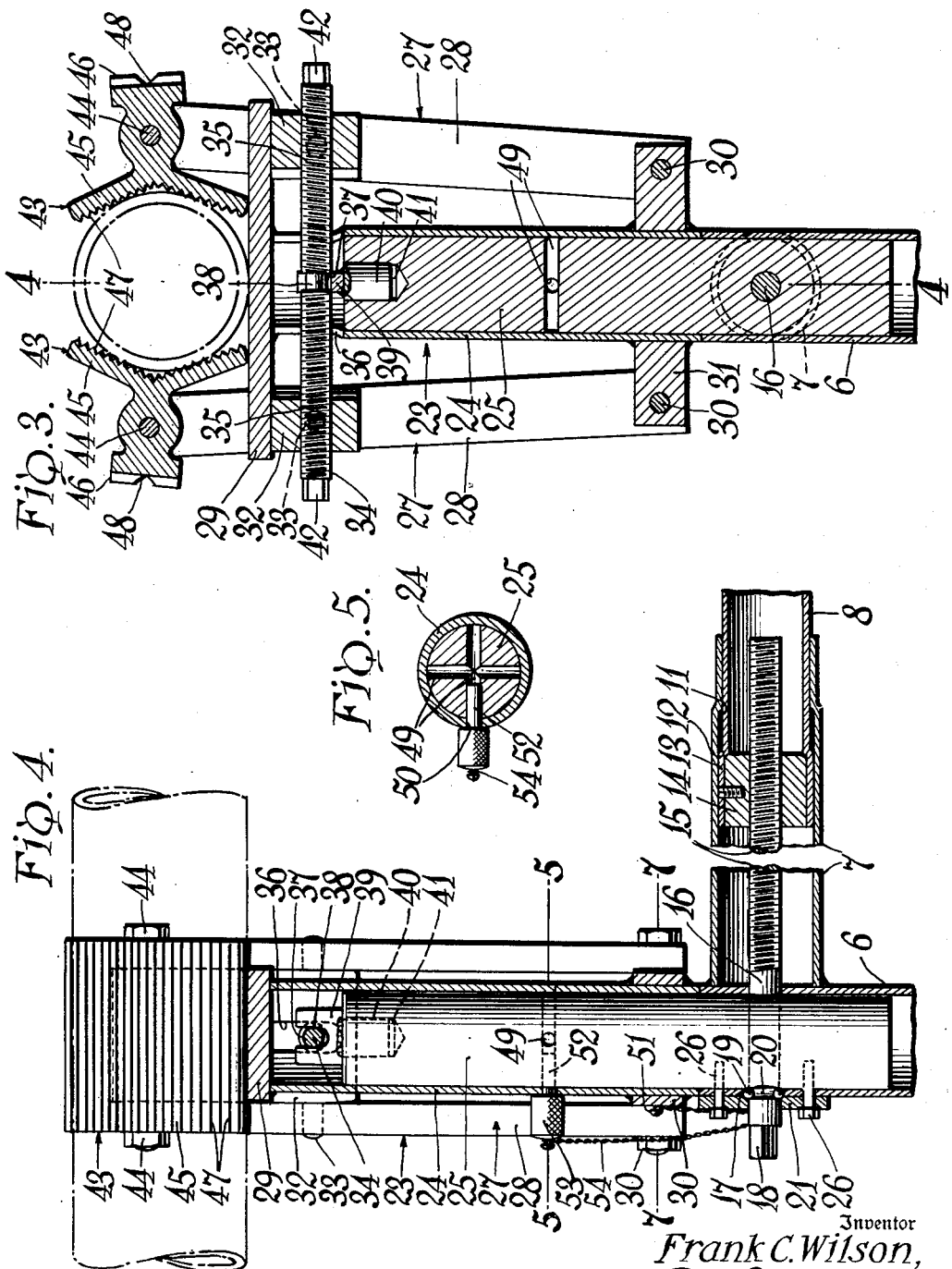
Inventor
Frank C. Wilson,
By John S Sowers
Attorney Patented June 8, 1954

2,680,287

UNITED STATES PATENT OFFICE 2,680,287

FOUR-WHEELED DOLLY FOR SUPPORTING MOTOR VEHICLE PARTS DURING REPAIR WORK

Frank C. Wilson, Arcade, N. Y., assignor to The Manufacturers and Traders Trust Company, Buffalo, N. Y., a corporation of New York; Jack A. Ahern and David D. Nash, both of Buffalo, N. Y., as executors of the estate of Kirke R. Wilson, deceased Application December 18, 1950, Serial No. 201,429

3 Claims. (Cl. 29—288)

This invention relates to four-wheeled dollies intended for principal use in connection with repair work upon sundry parts of motor vehicles.

The dolly of the invention is of the general type which includes opposed connected dolly units, each of which is mounted upon two wheels.

The principal object of the invention is to provide a dolly having the above stated characteristics wherein the units are combined with one another and with other features such that the dolly will support originally connected companion automobile parts, and its units, upon disconnection of the supported parts, may be adjustably moved away from one another without impairing the connection between them, each unit then being available for the support of one of the originally connected parts in any position which facilitates the particular work to be performed, the construction being such that when the work has been done the companion parts may be brought into alinement and the units may be moved toward one another to bring the alined parts into adjoining relation in which they may be reconnected and, as an entity, reassembled in the motor vehicle.

A further object is to provide a dolly having the features above generally described wherein either unit may be utilized individually, and independently of the other, for the support of special parts upon which work is to be done.

In the drawings I have shown a construction which, as now considered, is preferred.

Figure 1 is a perspective view, looking toward one side of the dolly, and showing the dolly units as individually supporting originally connected companion parts of a motor vehicle with the parts in disconnected relation and the dolly units, without impairing their connection, adjustably moved away from one another.

Figure 2 (Sheet 2) is a similar view wherein the companion parts have been individually moved in angular relation to positions which will facilitate the work.

Figure 3 (Sheet 3) is a vertical transverse sectional view of a work supporting element which forms a part of each dolly unit with the work engaging elements in one of their operating positions.

Figure 4 (Sheet 3) is a vertical longitudinal section on the line 4—4 of Figure 3.

Figure 5 (Sheet 3) is a detail horizontal section on the line 5—5 of Figure 4.

Figure 6 (Sheet 2) is a detail elevation of the work supporting element which forms a part of each dolly with the work engaging elements in operating positions reversed from the positions in which they are shown in Figure 3 for supporting engagement with a different motor vehicle part.

Figure 7 (Sheet 2) is a detail fragmentary horizontal sectional view in the plane 7—7 of Figure 4.

In the drawings the dolly is shown as used for the support of the rear axle assembly of a motor vehicle, such assembly comprising the usual two units or halves X and Y, which, in use, are coupled by bolt fastenings (not shown) in cooperation with opposed marginal flanges provided respectively upon the differential casing X' and its cover Y'.

The dolly includes generally similar opposed vertical units 1 and 2, each having a pair of supporting wheels 3. Each unit includes a triangular frame section which comprises a pair of downwardly divergent side bars 4, a transverse axle 5 and a central vertical column 6 which is preferably in the form of a tube or casing, the axle 5 extending through openings near the lower end of the column 6 and the lower ends of the bars 4 and having portions which project beyond the bars 4 and upon which the wheels 3 are mounted.

For the permanent, yet adjustable, connection of the dollies in opposed relation the unit 1 is provided with an inwardly projecting longitudinal horizontal sleeve 7 and the unit 2 is provided with an inwardly projecting longitudinal horizontal post 8 of tubular form. The sleeve 7 is rigidly connected, as by a weld, to the upper portion of the casing 6 of the unit 1 and the post 8 is similarly rigidly connected to the upper portion of the casing 6 of the unit 2.

The frame bars 4 are rigidly connected at their upper ends, as by welds, to the upper portions of the casings 6. The sleeve 7 and post 8 are braced relatively to the respective casings 6 by diagonal rigidly connected struts 9. Each casing 6 preferably carries a stabilizing leg 10 formed at its lower end for engagement with the floor and having such engagement when work is to be done upon the parts supported by the dolly units. The legs 10 are adjustable vertically of the casings 6 by means of any suitable connections whereby when the dolly is to be moved on its wheels 3 they may be raised clear of the floor and when the dolly is to be positioned for work they may be lowered into engagement with the floor.

The sleeve 7 and post 8 are in axial alinement and the post has a telescoping slidable fit within the sleeve. Near their free ends the sleeve 7 and post 8 are provided with annular shoulders 11 and 12, respectively, for cooperation as stops to prevent the complete separation of the sleeve 7 and the post 8 and thereby maintain the dolly units in permanently connected relation.

For the adjustment of the dolly units toward and away from one another a nut 14 and a cooperating screw stem 15 are provided. The post 8 is formed beyond the shoulder 12 with an extension 13 within which the nut 14 is mounted and fixed. The stem 15 has an outer unthreaded journal part 16 and the casing 6 of the dolly unit 1 is formed with bearing openings 17 to accommodate the part 16. The screw stem projects beyond the casing 6 and has a flat faced terminal extension 18. One of the openings 17 is formed as a raceway for ball bearings 19, the opposing raceway being provided by an annular groove 20 in the journal part 16. The bearings 19 are confined in their raceways by a plate 21 fixedly mounted upon the casing 6 and, of course, having a opening to accommodate the journal part 16. When the dolly units are to be adjusted toward or away from one another a detachable crank handle 22 may be used, the handle 22 having the usual socket to take over the extension 18 of the stem 15. By means of the handle 22 the screw stem 15 is turned in its bearings and, in cooperation with the nut 14 and according to the direction in which it is turned, effects the outward or inward movement of the unit 1 relatively to the unit 2.

Each dolly unit carries above its frame section a work holding element designated generally as 23. The operative characteristics of each element 23 are that it is independently capable of supporting a part upon which work is to be done, that it is available for the support of parts of different character, that it is available for the support of sundry working tools, and that it is mounted for independent angular adjustment to any position (in which it is stably held) which will facilitate the performance of the particular work. The operative characteristics of the elements 23 conjointly, and as companions, are that they are capable of supporting connected companion parts of a mechanism, of supporting the same companion parts individually and as separated for the purpose of enabling independent work to be simultaneously performed upon them, of re-aligning the companion parts when the work has been completed and of stably holding the companion parts, as re-aligned, while they are being connected.

The work holding elements 23 are supported at and upon the upper ends of the casings 6 and for this purpose in each instance include a vertical sleeve 24 diametrically coextensive with the corresponding casing 6 and with its lower end resting upon the upper end of the casing as a support.

Each sleeve 24 has a rotatable bearing upon a cylindrical journal 25 which is fixed to the corresponding column 6 and projects upwardly in axial relation from the column, the journal 25 fitting within the corresponding column 6 and sleeve 24. The journal 25 is connected in rigid relation to the column 6 by suitable screws 26 having tapped engagement in recesses in the journal 25 and extending through openings in the column 6, the screws 26 being incidentally utilized to secure the plates 21.

Each work holding element includes opposed carriers 27 for work engaging members, the carriers each holding a work engaging member and being adjustably movable toward and away from one another. In the construction shown and preferred each carrier 27 consists of a pair of spaced vertical arms 28 which are supported by the sleeve 24 and at their lower ends are pivotally mounted, as at 30, for adjustment toward or away from one another. The pivots 30 are carried by a horizontal plate 31 having an opening through which the sleeve 24 extends, the plate 31 being rigidly connected to the sleeve 24 as by welds. The arms of each pair carry at a distance suitably remote from their pivots horizontal cross members 32 having terminal pivotal connections 33 with the arms. The cross members 32 are functionally nuts for cooperation with a stem 34 having threads 35 in reverse relation at each side of its center, each series of threads 35 having cooperation with a corresponding cross member. The stem 34 projects through diametrically opposite vertical recesses 36 in the upper portion of the sleeve 24 and has a centrally located annular groove 37 which delimits a central reduced portion 38. The reduced portion 38 has a rotatable fit in a fork 39 carried by and projecting upwardly from the journal 25 and having a shank 40 which has a rotatable and slidable fit in an axial recess 41 in the upper end of the journal 25, the shank 40 and recess 41 providing a vertical swivel mounting for the fork 39. The opposite walls of the groove 37 provide shoulders which adjoin the sides of the fork 39 and thereby hold the stem 34 against displacement in its axial direction. The stem 34 projects outwardly beyond the cross members 32 and is formed with flat-faced terminal extensions 42, either of which may be engaged by the handle 22. Thereby the stem 34 may be rotated in either direction to move the opposing pairs of arms 28 toward or away from one another.

Each carrier 27 holds a work engaging member 43, these being in opposed relation. As shown the members 43 are provided with jaws for direct supporting engagement with the part on which work is to be done and are preferably pivotally mounted. Each member 43 is located between the arms 28 of a carrier 27 and is mounted upon a cross pin 44 carried by the arms, the cross pins 44 serving as pivots. Each member 43 is preferably provided with at least two differentiated jaws 45 and 46 respectively, the members 43 being fitted upon the cross pins 44 midway between their jaws whereby they may be moved manually to different positions in which different jaws may be used in opposed relation. Thus the jaws 45 of the members 43 are utilized in opposed relation and the jaws 46 are similarly utilized. As shown in the drawings the jaws 45 are of shallow V-shaped contour in vertical section for conjoint supporting engagement with a part of cylindrical cross section and are preferably provided with horizontal serrations 47 which prevent the supported cylindrical part from turning about its longitudinal axis; and the jaws 46 are provided with central V-shaped recesses 48 for conjoint supporting engagement with parts of such smaller dimensions that they cannot be accommodated by the jaws 45. It will, of course, be obvious that additional jaws may be provided on the members 43 and that the different jaws may have various useful conformations for work engaging purposes. Instead of being provided with jaws the work engaging members may carry devices known in the industry as "adapters," and which may be of various forms, for example, the universal adapter of the construction shown in the pending application for patent of Grant F. Silliman, Serial No. 106,309.

The adjustment of the opposing pairs of arms 28 toward and away from one another enables the arms to be adapted to work of different sizes and shapes. For engagement with the work either pair of corresponding jaws 45 or 46 may be selected as circumstances may require. In Figures 1, 2 and 3 the work is shown as held by the jaws 45. In Figure 6 the work is shown as held by the jaws 46, the work being shown in this instance as the front axle of a motor vehicle and the recesses 48 of the jaws 46 being shown as in engagement with coplanar flanges of such axle.

In order that the arms 28 may operate, both in adjustment and in work holding capacity, with freedom from loose play, a guide plate 29 preferably extends between the arms of each opposing pair with its sides adjoining the inner faces of the arms, this guide plate being conveniently mounted upon the upper end of the sleeve 24 to which it may be attached in any suitable way, as by welding.

The purpose of the rotatable mounting of the sleeve 24 upon the journal 25 is to enable the work holding element 23 to be moved angularly, i. e. about the axis of the sleeve 24, to a position which will best facilitate the particular work to be performed. Thus Figure 2 shows the opposing pairs of arms 28 as brought to positions ninety degrees distant from the position in which they are shown in Figure 1. Any suitable means may be provided for fixing the element 23 in any particular angular positions desired. For example, as shown in Figure 5, the journal 25 may be provided with a series of radial recesses 49 suitably spaced from one another, e. g. at intervals of ninety degrees, and the sleeve 24 may be provided with an opening 50 which, upon the sleeve being turned about the journal, may be brought into registry with any one of the recesses 49. The sleeve is held immovable relatively to the journal by a pin 52 which is inserted through the opening 50 and into the particular recess 49 with which the opening is in registry. The pin 52 carries a finger piece 53 which may be connected at the free end of a chain 54, the other end of the chain being secured as at 51 to the plate 31, the chain serving to prevent loss of the pin 50. It will, of course, be understood that other devices may be provided for holding the sleeve 24 against turning upon the journal 25 and that provision may be made for any desired number of angular positions of each work holding element 23.

The dolly is of particular utility for the support of extremely heavy and cumbersome parts upon which work is to be performed including parts that may be made in separately connected sections or units. The rear axle assembly of a motor vehicle as shown in Figures 1 and 2 is an example of such a part. This assembly is removed intact from the vehicle and placed intact upon the dolly, the arms 28 of the elements 23 being adjusted by the stem 34 to cause the jaws 45 firmly to grip and hold the cylindrical parts of the assembly housing. The assembly may be carried from the motor vehicle and located relatively to the dolly by workmen or it may be moved into position relatively to the dolly by a suitable hoist. As originally positioned upon the dolly the differential casing X' and its cover Y' are connected by bolt fastenings just as they were in use. When the units or halves X and Y of the assembly have been gripped by the work holders 23, as above described, the bolts connecting the differential casing X' and its cover Y' are removed and the screw stem 15 is thereupon turned by the handle 22 in order to move the dolly unit 2 to a suitable distance further from the dolly unit 1. During such adjustment of the dolly units the stabilizing legs 10 are elevated relatively to the floor. When the adjustment has been completed the legs 10 are lowered to engage the floor and are then fixed in position. This adjustment of the dolly unit 1 away from the dolly unit 2 separates the halves or units X and Y of the rear axle assembly. This relation is shown in Figure 1. With the halves of the rear axle assembly separated to a suitable extent, each work holding element 23 may be adjustably moved into a position which will best facilitate the particular work to be performed, such adjustment involving the turning of the element 23 about the corresponding journal 25, as shown in Figure 2. When each work holding element 23 has been brought into the position desired, it is fixed in such position by the engagement of the pin 52 in an appropriate recess 49 or by means of such other device as may be provided for this purpose. The dolly enables the work to be performed simultaneously upon both units or halves of the rear axle assembly by different workmen, thereby effecting valuable saving of time and labor. The supporting frames of the dolly units are of such construction that they have ample strength for the support of the heaviest parts of the motor vehicle. The dolly as a whole has its parts in such relation that it is well balanced and in no way liable to tip laterally under the weight of the heaviest parts. The work holding elements 23 are not only adjustable to favorable angular positions, as above described, but may also be engaged with the parts upon which work is to be performed at such points along the length of said parts as will facilitate the work and maintain the dolly in stable supporting balance.

When the work has been completed the work holding elements are restored to their original positions as shown in Figure 1, thereby to bring the units or halves of the rear axle assembly into alinement. The handle 22 is then used to turn the stem 15 in a direction which will cause the movement of the dolly unit 1 toward the dolly unit 2, this movement being continued until it is arrested by the abutting engagement of the flanges of the differential casing X' and its cover Y'. Thereupon the connecting bolts are reapplied and the work holding elements 23 are adjusted to release the rear axle assembly, at which time the assembly may be restored to the motor vehicle and again connected in operative relation.

The front axle of the motor vehicle is of a form and dimensions such that it may be more satisfactorily held by the jaws 46, the recesses 48 of which accommodate the marginal portions of coplanar flanges of the axle. Such use of the jaws 46 involves a substantial reversal of the work engaging members 43 from the positions shown in Figure 3 to the positions shown in Figure 6. This is accomplished manually simply by swinging the members 43 about their pivots 44.

I claim:

1. A four-wheeled dolly for the support of motor vehicle parts during repair work comprising, in combination, two opposed dolly units, each consisting of a supporting frame provided with a pair of floor engaging wheels and a work holding element centrally located relatively to the frame and supported by and upon the frame, connecting means between the frames of the dolly units which may be operated while the work holding elements carry the parts upon which work is to be done to effect the adjustable positioning of the dolly units nearer to or further from one another, and means consisting of two horizontal longitudinally extending parts secured to and projecting from the respective frames and fitted together in slidable relation and an adjusting device cooperating with the parts for relatively positioning the units nearer to or further from one another, each work holding element comprising a pair of opposed work engaging members which cooperate to clamp and thereby support a motor vehicle part upon which work is to be performed, a carrier for each work engaging member, the carriers of each pair being mounted in opposed relation, and means for adjustably moving the carriers of each pair toward or away from one another, the work engaging member participating in the movements of the carriers and thereby being moved into or from supporting engagement with the part upon which work is to be done at opposite sides thereof, a journalled connection between each work holding element and the corresponding frame whereby each work holding element and the part supported thereby upon which work is to be done may be moved rotatably relatively to the corresponding frame about a vertical axis into any position which will facilitate the particular work to be performed upon the supported motor vehicle part, and means for holding each work holding element in a particular position to which it may be moved about the vertical axis.

2. A dolly as set forth in claim 1 wherein each supporting frame includes a central vertical tubular column, the horizontal longitudinally extending parts are secured to the respective columns, and the journalled connections are between the work holding elements and the columns.

3. A dolly as set forth in claim 1 wherein each supporting frame includes a central vertical tubular column, the horizontal longitudinally extending parts are secured to the respective columns, one of these parts being a sleeve and the other being a post in axial alinement with the sleeve and having a telescoping fit within it, and the adjusting device consists of a nut and a screw stem, the nut being rigidly secured to the inner end of the post and the screw stem engaging the nut, extending through the sleeve and being journalled in the wall of the column which carries the sleeve, the screw stem having a part which projects outwardly beyond said column and by which it may be turned, the sleeve and post being formed with annular shoulders which cooperate as stops to limit the relative outward adjustable movements of the dolly units.

References Cited in the file of this patent

UNITED STATES PATENTS

| Number | Name | Date |
|---|---|---|
| 564,543 | Straw | July 21, 1896 |
| 582,347 | Du Bois | May 11, 1897 |
| 697,887 | Roberts | Apr. 15, 1902 |
| 1,386,080 | Simmons | Aug. 2, 1921 |
| 1,481,503 | Carswell et al. | Jan. 22, 1924 |
| 1,600,835 | Manley | Sept. 21, 1926 |
| 1,812,585 | Collins | June 30, 1931 |
| 1,953,814 | McDevitt | Apr. 3, 1934 |
| 2,106,367 | Vollmer | Jan. 25, 1938 |
| 2,427,695 | Smith | Sept. 23, 1947 |
| 2,505,665 | Franck | Apr. 25, 1950 |